United States Patent
Kim (10) Patent No.: US 10,295,057 B2
(45) Date of Patent: May 21, 2019

(54) PISTON PIN WITH ECCENTRIC CENTER OF GRAVITY USING DIFFERENT MATERIALS AND METHOD FOR MANUFACTURING THE SAME

(71) Applicant: HYUNDAI MOTOR COMPANY, Seoul (KR)

(72) Inventor: Hak-Soo Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 171 days.

(21) Appl. No.: 15/360,294

(22) Filed: Nov. 23, 2016

(65) Prior Publication Data
US 2017/0167607 A1 Jun. 15, 2017

(30) Foreign Application Priority Data
Dec. 11, 2015 (KR) .................. 10-2015-0176869

(51) Int. Cl.
| | |
|---|---|
| *F16J 1/16* | (2006.01) |
| *B21K 1/06* | (2006.01) |
| *B21K 25/00* | (2006.01) |
| *C22C 38/00* | (2006.01) |
| *C22C 38/02* | (2006.01) |
| *C22C 38/44* | (2006.01) |
| *C22C 38/46* | (2006.01) |

(52) U.S. Cl.
CPC .............. *F16J 1/16* (2013.01); *B21K 1/06* (2013.01); *B21K 25/00* (2013.01); *C22C 38/002* (2013.01); *C22C 38/02* (2013.01); *C22C 38/44* (2013.01); *C22C 38/46* (2013.01)

(58) Field of Classification Search
CPC ............................ F16J 1/16; Y10T 29/49266
See application file for complete search history.

(56) References Cited

U.S. PATENT DOCUMENTS

| | | | | |
|---|---|---|---|---|
| 1,670,564 A | * | 5/1928 | Breer ................ | F16J 1/16 29/509 |
| 2,770,511 A | * | 11/1956 | Powell ................ | F16J 1/16 403/150 |
| 4,311,406 A | * | 1/1982 | Driver ................ | F02F 7/0085 403/150 |
| 4,430,906 A | * | 2/1984 | Holtzberg .............. | C08G 73/14 29/888.05 |
| 4,456,653 A | * | 6/1984 | Ruegg ................. | B29C 43/003 403/150 |
| 5,327,813 A | * | 7/1994 | DeBell ................ | F16J 1/16 123/193.6 |

(Continued)

FOREIGN PATENT DOCUMENTS

| | | |
|---|---|---|
| JP | H06-101759 A | 4/1994 |
| JP | 2004-353500 A | 12/2004 |

(Continued)

*Primary Examiner* — Thomas E Lazo
(74) *Attorney, Agent, or Firm* — Morgan Lewis & Bockius LLP (57) ABSTRACT

A piston pin has an eccentric center of gravity and formed of different materials and is installed through a piston and an upper end of a connecting rod. The piston pin includes a cylindrical outer member and a cylindrical inner member formed of a material which has a lower density than the outer member and is arranged in the outer member.

17 Claims, 9 Drawing Sheets

(56) References Cited

U.S. PATENT DOCUMENTS

| | | | | |
|---|---|---|---|---|
| 6,062,733 A | * | 5/2000 | Cobble | F16J 1/16 384/294 |
| 2010/0154628 A1 | * | 6/2010 | Porta | F16J 1/16 92/187 |
| 2010/0232870 A1 | * | 9/2010 | Golya | F16J 1/16 403/150 |
| 2013/0276626 A1 | * | 10/2013 | Lochmann | F16J 1/16 92/187 |
| 2017/0114898 A1 | * | 4/2017 | Hayman | F04B 53/14 |

FOREIGN PATENT DOCUMENTS

| | | |
|---|---|---|
| JP | 2011-021584 A | 2/2011 |
| JP | 2011-231744 A | 11/2011 |
| KR | 10-1997-0062302 A | 9/1997 |
| KR | 10-2005-0010481 A | 1/2005 |
| KR | 10-2014-0087604 A | 7/2014 |

* cited by examiner

FIG. 1A

— Prior Art —

FIG. 1B

— Prior Art —

PISTON PIN WITH ECCENTRIC CENTER OF GRAVITY USING DIFFERENT MATERIALS AND METHOD FOR MANUFACTURING THE SAME

CROSS-REFERENCE TO RELATED APPLICATIONS

This application claims the benefit of priority to Korean Patent Application No. 10-2015-0176869, filed on Dec. 11, 2015, which is incorporated herein by reference in its entirety.

TECHNICAL FIELD

The present disclosure relates to a piston pin for connecting a piston and a connecting rod in an engine and a method for manufacturing the same, and more particularly, to a piston pin with an eccentric center of gravity, including an outer member and an inner member, which are formed of different materials, and a method for manufacturing the same.

BACKGROUND

Figure 1A:
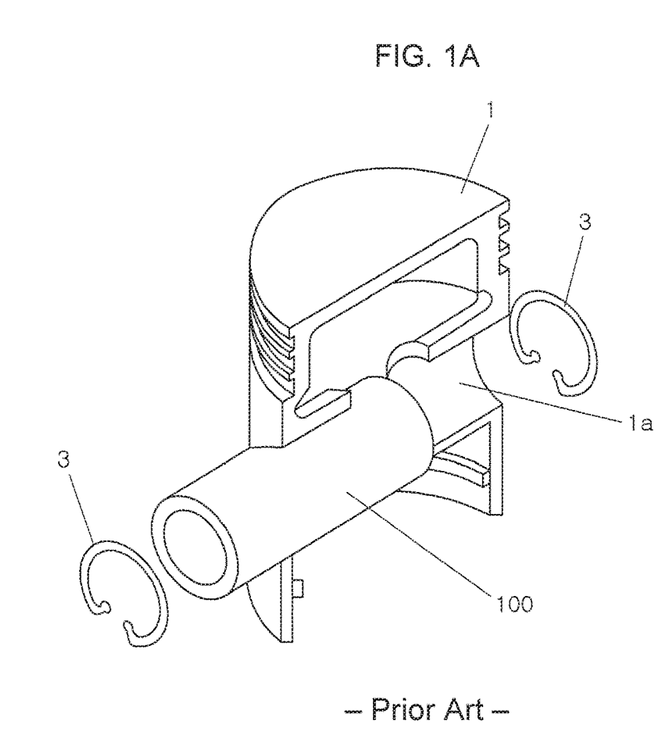
FIGS. 1A and 1B are exploded perspective views illustrating a state in which a piston and a connecting rod are connected through a conventional piston pin.
Figure 1B:
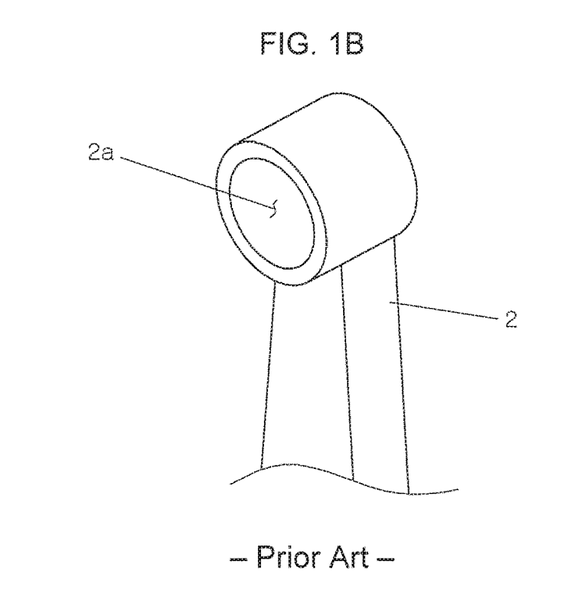

As illustrated in FIGS. 1A and 1B, a piston pin 100 for connecting a piston 1 and a connecting rod 2 in an engine is formed in a cylindrical shape.

The piston pin 100 is fixed to the piston 1 through a snap ring 3 in a state where the piston pin 100 is passed through the upper end of the connecting rod 2 and the piston 1, thereby connecting the piston 1 and the connecting rod 2.

The conventional piston pin 100 is formed of a single material, and the piston pin 100 has the center of gravity which coincides with the geometric center of the piston pin 100.

Thus, since the piston pin 100 is not rotated when the engine operates, lubrication may not normally perform.

In order to solve such a problem, the piston pin 100 is manufactured to have an eccentric center of gravity with respect to the geometric center thereof. Then, the piston pin 100 is rotated when the piston 1 is lifted or lowered. When the piston pin 100 has an eccentric center of gravity, acceleration is applied in the vertical direction while the piston 1 is lifted or lowered. Then, the piston pin 100 is rotated to improve lubrication.

However, in order to manufacture the piston pin 100 with an eccentric center of gravity, bending deformation of the piston 1 or deformation in cross-sectional shape of the piston 1 must be considered. That is, in order to apply eccentricity in a state where the piston 1 is safely designed to prevent deformation of the piston pin 100, the inner diameter of the piston pin must be reduced while a minimum thickness is maintained. Thus, the weight of the piston pin 100 is increased. When the center of gravity of the piston pin 100 is eccentrically set without the increase in weight of the piston pin 100, a safety factor is inevitably damaged.

SUMMARY

An aspect of the present disclosure is directed to a piston pin having an eccentric center of gravity and formed of different materials, which has an eccentric center of gravity while the weight thereof is not increased, and is rotated by a piston which is lifted or lowered during operation of an engine, thereby improving lubrication performance, and a method for manufacturing the same.

Other objects and advantages of the present disclosure can be understood by the following description, and become apparent with reference to the embodiments of the present disclosure. Further, it is obvious to those skilled in the art to which the present disclosure pertains that the objects and advantages of the present disclosure can be realized by the means as claimed and combinations thereof.

In accordance with an embodiment of the present disclosure, a piston pin has an eccentric center of gravity and formed of different materials and is installed through a piston and an upper end of a connecting rod. The piston pin may include: a cylindrical outer member; and a cylindrical inner member formed of a material having a lower density than the outer member, and arranged in the outer member.

The outer member may be formed of a steel-based alloy.

The outer member may include titanium carbide (TiC).

The outer member may be formed of a mixture of cold alloy tool steel and TiC, the cold alloy tool steel containing 1.4 wt % to 1.6 wt % of carbon (C), 11 wt % to 13 wt % of chrome (Cr), 11 wt % to 13 wt % of molybdenum (Mo), 0.8 wt % to 1.2 wt % of nickel (Ni), 0.2 wt % to 0.5 wt % of vanadium (V), 0.0001 wt % to 0.4 wt % of silicon (Si), 0.0001 wt % to 0.6 wt % of manganese (Mn), 0.0001 wt % to 0.03 wt % of phosphorous (P), 0.0001 wt % to 0.03 wt % of sulfur (S) and the rest wt % of steel (Fe).

The outer member may contain 20 wt % of TiC.

The inner member may be formed of one or more selected from the group consisting of aluminum (Al) alloy, titanium (Ti) alloy and carbon fiber-reinforced plastic (CFRP).

The inner member may be forced into the outer member.

At a portion adjacent to an end of the outer member, the outer member may have an inner diameter that increases toward the end thereof, such that the thickness thereof decreases.

The outer member may have a constant outer diameter.

The inner member may be inclined to have a concave end portion.

In accordance with another embodiment in the present disclosure, a piston pin has an eccentric center of gravity and formed of different materials and is installed through a piston and an upper end of a connecting rod. The piston pin may include: a cylindrical outer member; and a cylindrical inner member formed in the outer member and having a center arranged at a position which is eccentric with respect to a center of the outer member.

The center of gravity of the piston pin may be positioned eccentrically with respect to the center of the outer member.

The center of gravity of the piston pin may be positioned in the opposite direction of the center of the inner member from the center of the outer member.

The outer member may have higher density than the inner member.

In accordance with another embodiment in the present disclosure, a piston pin having an eccentric center of gravity and formed of different materials, the piston pin being installed through a piston and an upper end of a connecting rod. The piston pin may include: a cylindrical outer member; a cylindrical inner member formed of a material having lower density than the outer member, arranged in the outer member, and having the center which is eccentric with respect to the center of the outer member.

The outer member may be formed of a steel-based alloy.

The outer member may include TiC.

The outer member may be formed of a mixture of cold alloy tool steel and TiC, the cold alloy tool steel containing 1.4 wt % to 1.6 wt % of C, 11 wt % to 13 wt % of Cr, 11 wt % to 13 wt % of Mo, 0.8 wt % to 1.2 wt % of Ni, 0.2 wt % to 0.5 wt % of V, 0.0001 wt % to 0.4 wt % of Si, 0.0001 wt % to 0.6 wt % of Mn, 0.0001 wt % to 0.03 wt % of P, 0.0001 wt % to 0.03 wt % of S and the rest wt % of Fe.

The outer member may contain 20 wt % of TiC.

The inner member may be formed of one or more selected from the group consisting of Al alloy, Ti alloy and CFRP.

The center of gravity of the piston pin may be positioned in the opposite direction of the center of the inner member from the center of the outer member.

At a portion adjacent to an end of the outer member, the outer member may have an inner diameter that increases toward the end, such that the thickness thereof decreases.

The outer member may have a constant outer diameter.

The inner member may be inclined to have a concave end portion.

In accordance with another embodiment in the present disclosure, a method for manufacturing a piston pin having an eccentric center of gravity and formed of different materials, the piston pin being installed through a piston and an upper end of a connecting rod. The method may include: placing a cylindrical outer member in a die in which a punching device is installed to be lifted or lowered; forcing a cylindrical inner member into the outer member, such that the inner member is arranged in the outer member, the inner member being formed of a different material from the outer member; and pressurizing both ends of the outer member and the inner member such that the inner member does not come off the outer member.

The outer member may have a constant outer diameter. At a portion adjacent to an end of the outer member, the outer member may have a thickness that decreases toward the end. The pressurizing of both ends of the outer member and the inner member may include pressurizing the end of the inner member with respect to the outer member such that the end portion of the inner member is concavely deformed.

The pressurizing of both ends of the outer member and the inner member may include deforming the inner member such that the outer diameter of the inner member is increased at a portion adjacent to the end of the inner member.

The inner member may be forced into the outer member in a state where inner member is eccentric with respect to the outer member.

The inner member may be formed of a material having lower density than the outer member.

The outer member may be formed of a mixture of cold alloy tool steel and TiC, the cold alloy tool steel containing 1.4 wt % to 1.6 wt % of C, 11 wt % to 13 wt % of Cr, 11 wt % to 1.3 wt % of Mo, 0.8 wt % to 1.2 wt % of Ni, 0.2 wt % to 0.5 wt % of V, 0.0001 wt % to 0.4 wt % of Si, 0.0001 wt % to 0.6 wt % of Mn, 0.0001 wt % to 0.03 wt % of P, 0.0001 wt % to 0.03 wt % of S and the rest wt % of Fe.

The outer member may contain 20 wt % of TiC.

BRIEF DESCRIPTION OF THE DRAWINGS

FIGS. 8A-8D are diagrams illustrating the method for manufacturing a piston pin having an eccentric center of gravity and formed of different materials in accordance with the embodiment in the present disclosure.

DESCRIPTION OF SPECIFIC EMBODIMENTS

Exemplary embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope in the present disclosure to those skilled in the art. Throughout the disclosure, like reference numerals refer to like parts throughout the various figures and embodiments in the present disclosure.

Hereafter, a piston pin having an eccentric center of gravity and formed of different materials will be described with reference to the accompanying drawings.

Figure 2:
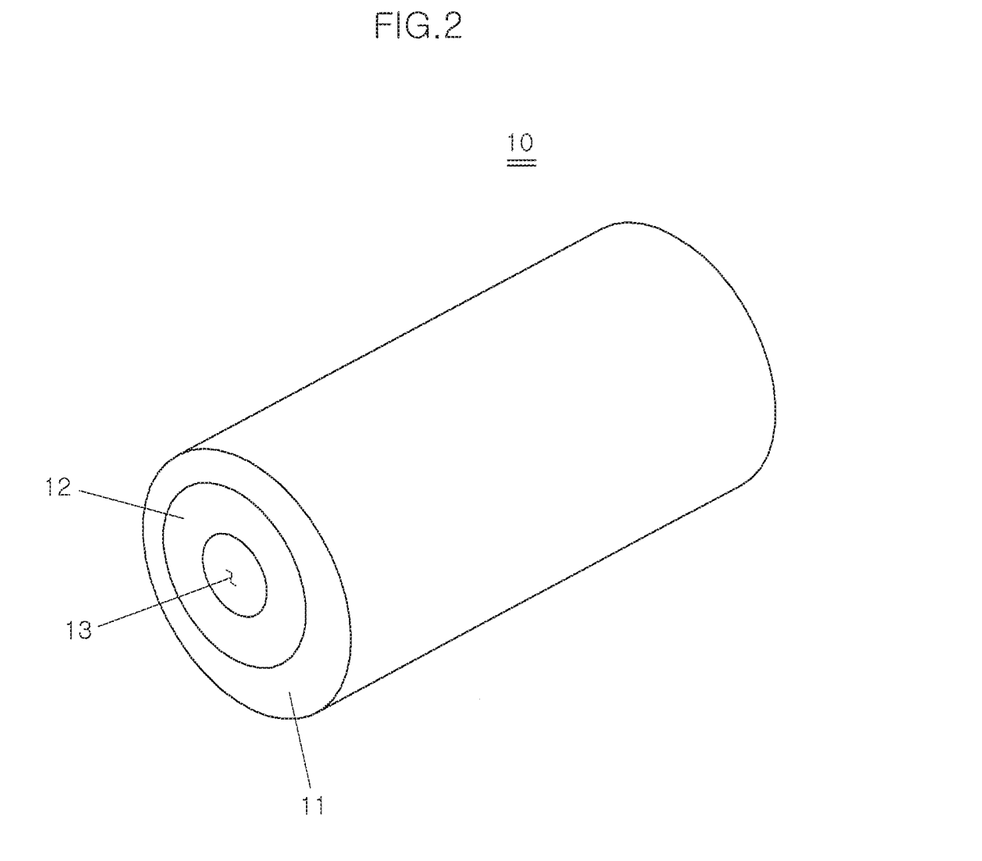
FIG. 2 is a perspective view of a piston pin having an eccentric center of gravity and formed of different materials in accordance with an embodiment in the present disclosure.
Figure 3:
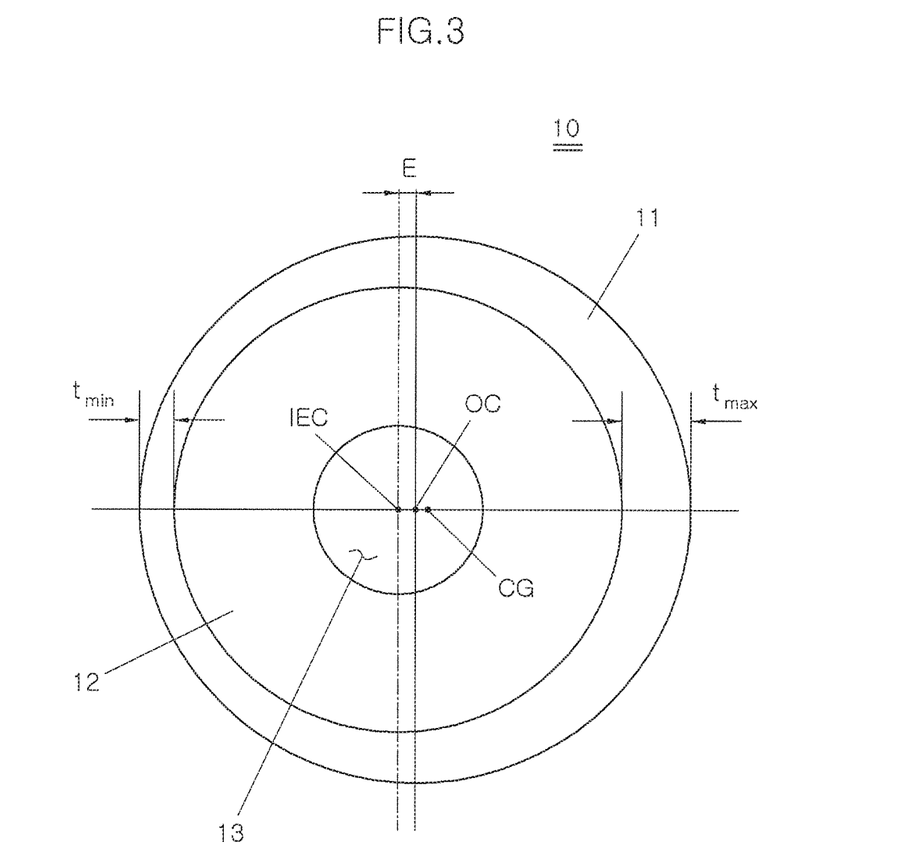
FIG. 3 is a cross-sectional view of the piston pin having an eccentric center of gravity and formed of different materials in accordance with the embodiment in the present disclosure.

A piston pin 10 having an eccentric center of gravity and formed of different materials in accordance with the present disclosure may include an outer member 11 and an inner member 12 which are formed of differential materials, and the inner member 12 is eccentrically positioned in the outer member 11.

The outer member 11 may have a cylindrical shape.

The outer member 11 may have a thickness which has stability with respect to bending deformation, that is, deformation in the longitudinal direction of the piston pin 10, when the outer member 11 independently exists. The cross-section of the outer member 11 in the direction perpendicular to the axial direction thereof may be formed to have an eccentric inner diameter. Thus, one side of the circumference of the outer member 11 may have a larger thickness than the other side thereof. That is, any one side of the circumference of the outer member 11 may have the minimum thickness $t_{min}$, and the opposite side of the circumference of the outer member 11 may have the maximum thickness $t_{max}$.

The outer member 11 may be formed of steel or a material having an elastic coefficient equal to or more than the steel, and include titanium carbide (TiC).

The outer member 1 may be manufactured by forging steel. In certain embodiments, the outer member 11 may be manufactured through a metal injection molding process using a material in which cold alloy tool steel and TiC are mixed.

The cold alloy tool steel, which is an alloy corresponding to JIS-SKD11 or KS-STD11, may include 1.4 wt % to 1.6 wt % of carbon (C), 11 wt % to 13 wt % of chrome (Cr), 11 wt % to 13 wt % of molybdenum (Mo), 0.8 wt % to 1.2 wt % of nickel (Ni), 0.2 wt % to 0.5 wt % of vanadium (V), 0.0001 wt % to 0.4 wt % of silicon (Si), 0.0001 wt % to 0.6 wt % of manganese (Mn), 0.0001 wt % to 0.03 wt % of phosphorous (P), 0.0001 wt % to 0.03 wt % of sulfur (S) and the rest wt % of steel (Fe).

At this time, 20 wt % of TIC may be mixed to form the outer member 11.

The inner member 12 may have a cylindrical shape, like the outer member 11.

The inner member 12 may have a thickness which has stability for the deformation of the cross-sectional shape (oval deformation), and include a hollow portion 13 formed in the center thereof.

The inner diameter of the outer member 11 is formed to match the outer diameter of the inner member 12. Further, the inner member 12 may be formed to a constant thickness.

The inner member 12 may be formed of a material having lower density than the outer member 11.

The inner member 12 may include an aluminum (Al) alloy, titanium (Ti) alloy, carbon fiber-reinforced plastic (CFRP) and the like. That is, the inner member 12 may be formed of one or more selected from the group consisting of an Al alloy, Ti alloy and CFRP.

In particular, the inner member 12 may be formed of an Al alloy. When the inner member 12 is formed of an Al alloy, the weight of the inner member 12 can be reduced, and the thermal stability of the inner member 12 can be increased while the inner member 12 is forced into the outer member 11.

The inner member 12 may be forced into the outer member 11 so as to form the piston pin 10 in accordance with the present disclosure.

Figure 9A:
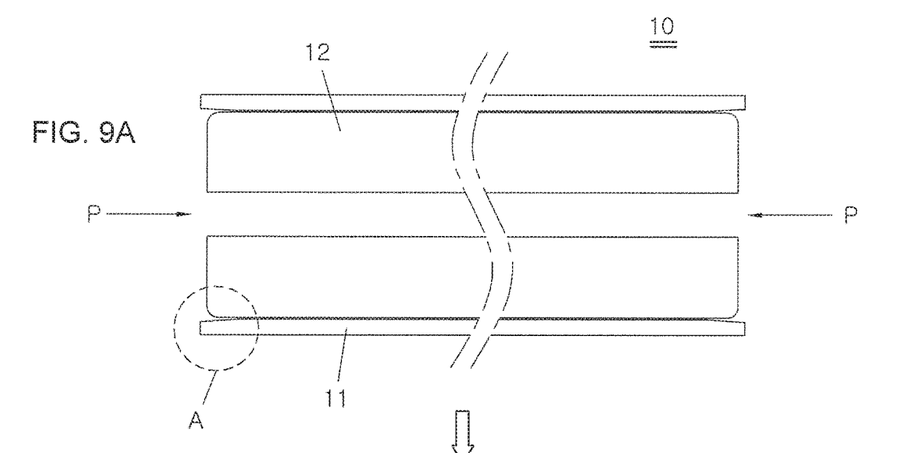
FIGS. 9A and 9B are cross-sectional views illustrating a state before and after the piston pin having an eccentric center of gravity and formed of different materials in accordance with the embodiment in the present disclosure is pressurized.
Figure 9B:
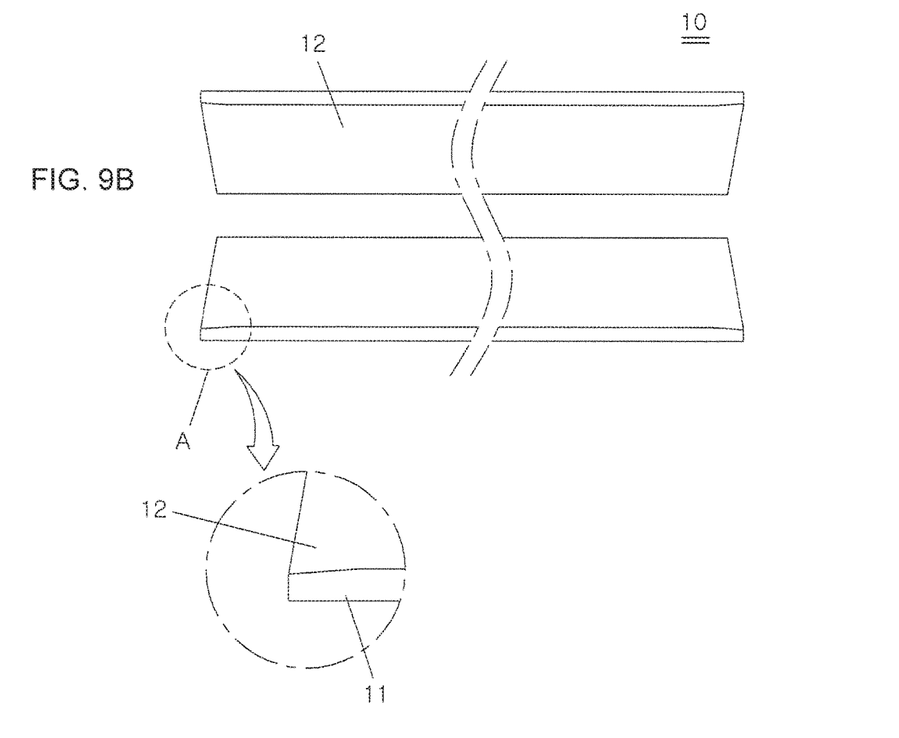

A portion of the outer member 11, which is adjacent to an end, has a thickness which decreases toward the end in a state where the outer diameter thereof is constant, and the inner member 12 has an end portion which is concavely inclined (refer to FIGS. 9A and 9B).

The inner diameter of the outer member 11 may be eccentric with respect to the diameter of the outer member 11. Thus, when the piston pin 10 is manufactured by forcing the inner member 12 into the outer member 11, the center of gravity of the manufactured piston pin 10 may exist at a position eccentric with respect to the geometric center of the outer member 11.

As the inner member 12 with a normal center of gravity is inserted into the outer member 11 with an eccentric center of gravity, the piston pin 10 may have an eccentric center of gravity.

That is, as illustrated in FIG. 3, the piston pin 10 may have an eccentric center of gravity (CG) with respect to the center OC of the piston pin 10.

In particular, since the outer member 11 is formed of a material having lower density than the inner member 12, the outer member 11 may have the center of gravity CG which is eccentric in the opposite direction of the center IEC of the inner member 12 from the center OC of the outer member 11.

Since the piston pin 10 in accordance with the present disclosure includes the outer member 11 and the inner member 12 which are formed of different materials and the inner member 12 is eccentrically positioned in the outer member 11, the piston pin 10 may be rotated while being lifted or lowered with the piston 1 during the operation of the engine.

Figure 4:
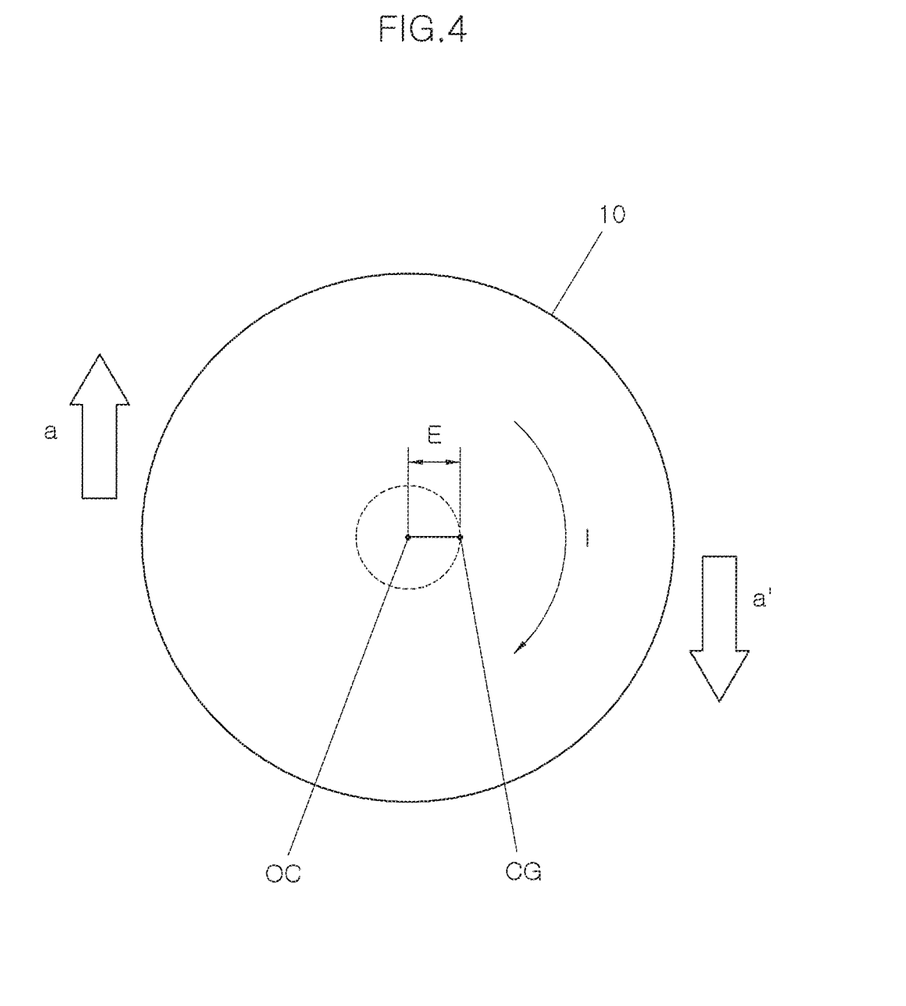
FIG. 4 is a schematic view illustrating the principle that the piston pin having an eccentric center of gravity and formed of different materials in accordance with the embodiment in the present disclosure is rotated when a piston is lifted.

That is, as illustrated in FIG. 4, acceleration may be applied to the piston pin 10 as the piston 1 is lifted or lowered. In FIG. 4, when the piston 1 is lifted, acceleration may be applied in a direction A, and when the piston 1 is lowered, acceleration may be applied in a direction A'.

At this time, while the side at which the center of gravity of the piston pin 10 is eccentric (the side at which the outer member has the maximum thickness) leans toward the direction of the acceleration, the piston pin 10 may rotate.

Figure 5:
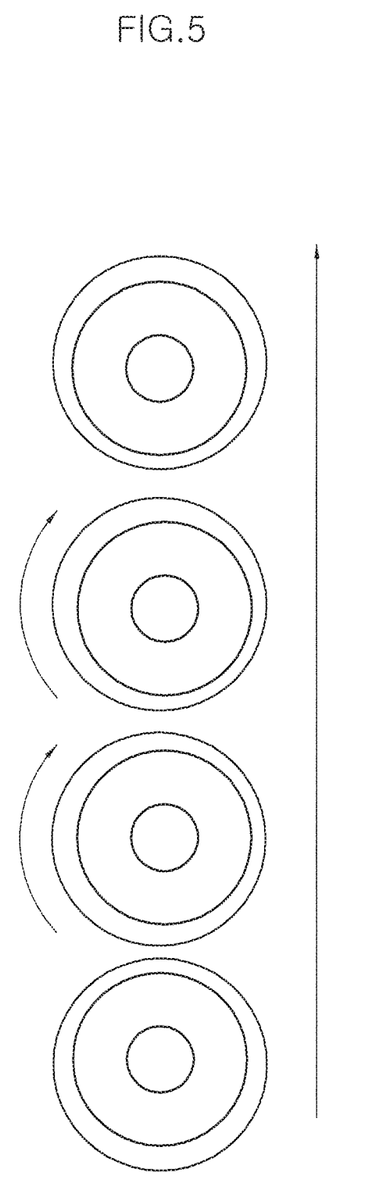
FIG. 5 is a cross-sectional view illustrating a state in which the piston pin having an eccentric center of gravity and formed of different materials in accordance with the embodiment in the present disclosure is rotated when the piston is lifted.
Figure 6:
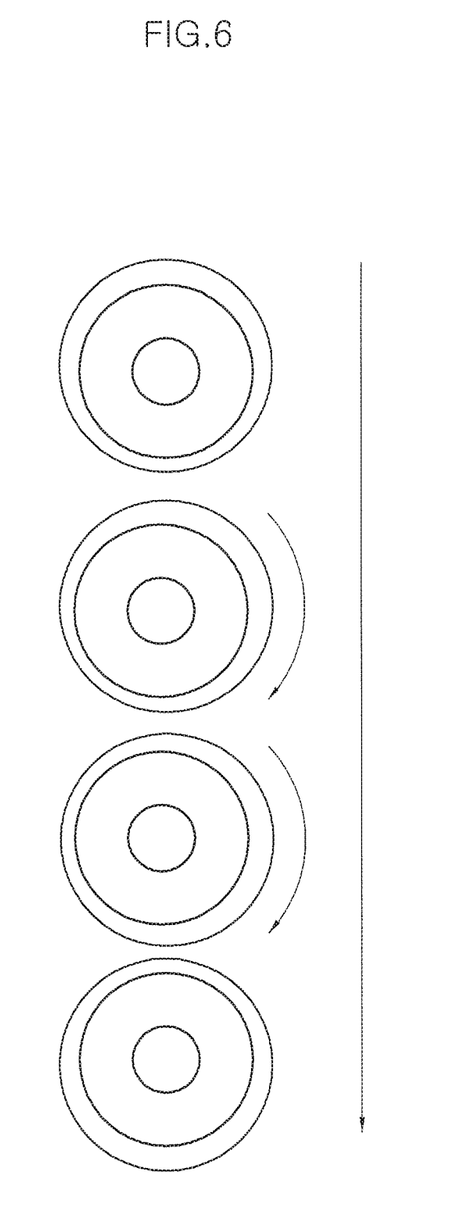
FIG. 6 is a cross-sectional view illustrating a state in which the piston pin having an eccentric center of gravity and formed of different materials in accordance with the embodiment in the present disclosure is rotated when the piston is lowered.

For example, when the piston 1 is lifted, the side at which the center of gravity of the piston pin 10 is eccentric may lean upward from the current position (refer to FIG. 5), and when the piston 1 is lowered, the side at which the center of gravity of the piston pin 10 is eccentric may lean downward from the current position (refer to FIG. 6), While the above-described process is repeated, the piston pin 10 may be rotated to improve lubrication performance.

Figure 7:
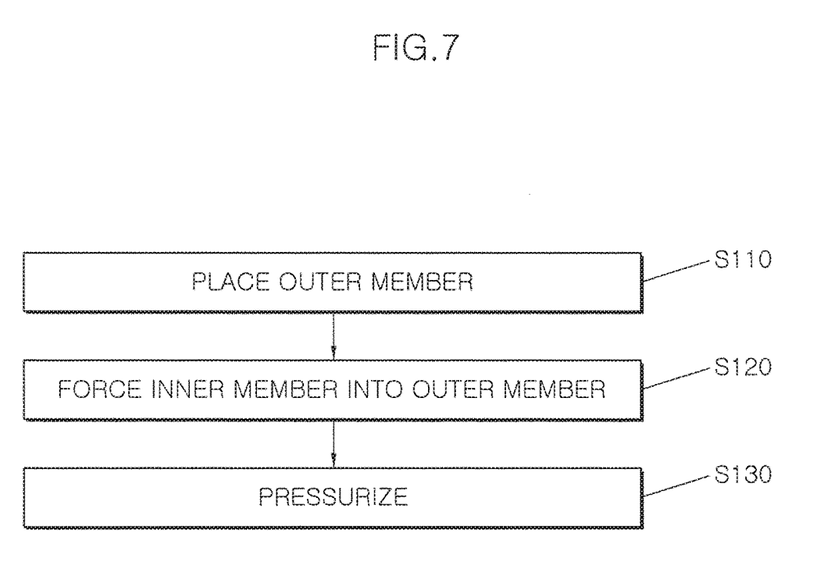
FIG. 7 is a flowchart illustrating a method for manufacturing a piston pin having an eccentric center of gravity and formed of different materials in accordance with an embodiment in the present disclosure.
Figure 8A:
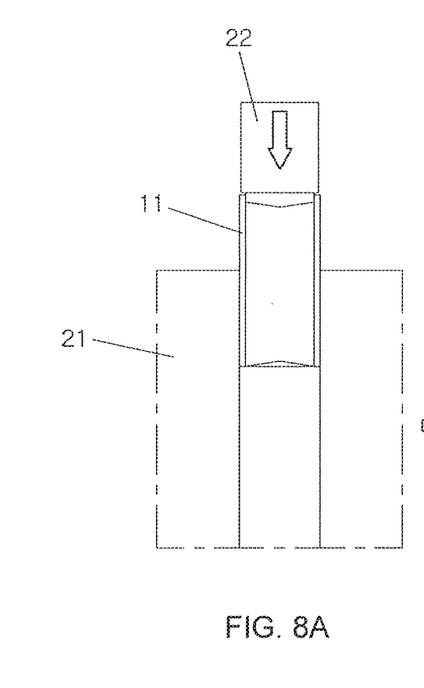

FIGS. 7 and 8 illustrate a method for manufacturing a piston pin having an eccentric center of gravity and formed of different materials in accordance with an embodiment in the present disclosure.

The method for manufacturing the piston pin 10 having an eccentric center of gravity and formed of different materials may include placing a cylindrical outer member 11 in a die 21 in which a punching device 22 is installed to be lifted and lowered, at step S110; forcing a cylindrical inner member 12 into the punching device 22 such that the inner member 12 is arranged in the outer member 11, the inner member 12 being formed of a different material from the outer member 11, at step S120; and pressurizing both ends of the outer member 11 and the inner member 12 such that the inner member 12 does not come off the outer member 11, at step S130.

Figure 8B:
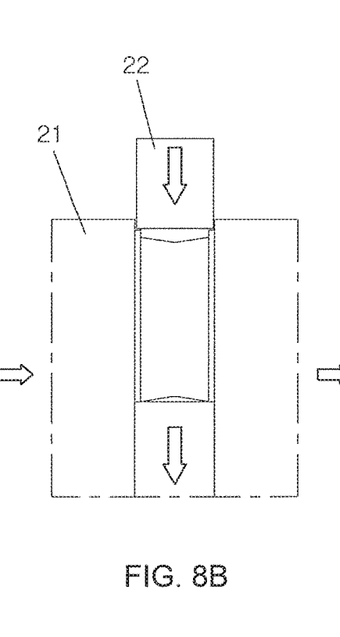

At step S110, the previously manufactured outer member 11 may be placed in the die 21. The outer member 11 may be positioned in a through-hole formed in the die 21 (refer to FIG. 8A). Then, the outer member 11 may be pressurized by the punching device 22 which is lifted and lowered with respect to the die 21, and positioned in the die 21 (refer to FIG. 8B).

At step S120, the inner member 12 formed in a cylindrical shape may be forced into the outer member 11. The inner member 12 may be positioned in such a manner that the outer diameter thereof coincides with the inner diameter of the outer member 11, and the punching device 22 may be moved toward the die 21 to force the inner member 12 into the outer member 11 (refer to FIG. 8C).

Figures 8C, 8D:
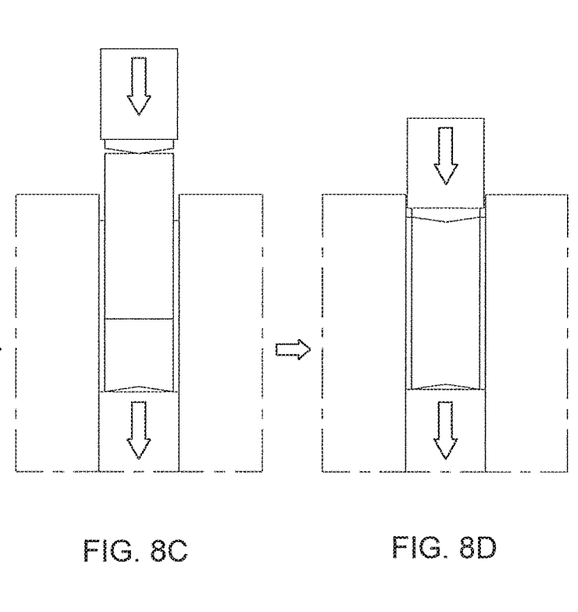

At this time, since the outer member 11 and the inner member 12 are formed of different materials and the outer member 11 has an eccentric inner diameter, the inner member 12 may be eccentrically positioned in the outer member 11, and the piston pin 10 may have an eccentric center of gravity CG with respect to the geometric center of the piston pin 10.

When the inner member 12 is positioned in the outer member 11, both ends of the outer member 11 and the inner member 12, which are assembled to each other, may be pressurized by the punching device 22 at step S130 (refer to FIG. 8D).

Through step S130, the outer member 11 and the inner member 12 may be coupled to each other.

In particular, when the outer member 11 and the inner member 12 are completed into the piston pin 10, the ends of the outer member 11 and the inner member 12 or portions of the outer member 11 and the inner member 12, which are adjacent to the ends, may be deformed in order to prevent the inner member 12 from coming off the outer member 11.

That is, before step S130, the portion of the outer member 11, which is adjacent to the end, may have a thickness that decreases toward the end of the outer member 11. The outer member 11 may have a constant thickness even before or after step S130. When both ends of the piston pin 10 are pressurized through step S130, the ends of the outer member 11 and the inner member 12 and the portions of the outer member 11 and the inner member 12, which are adjacent to the ends, may be deformed (refer to FIGS. 9A and 9B). As illustrated in enlarged part A of FIG. 9B, the outer diameter of the inner member 12 may be increased at the portion of the inner member 12, which is adjacent to the end, and the inner member 12 may be concavely deformed toward the center of the cross-section thereof. It improves the binding force of the inner member 12 and outer member 11.

In accordance with the embodiments of the present disclosure, the piston pin may include the outer member and the inner member which are formed of different materials, and the inner member may be eccentrically arranged in the outer member.

Furthermore, as the piston pin is coupled to the piston in a state where the center of gravity of the piston pin is eccentrically set, the piston pin may rotate when the piston is lowered and lifted during the operation of the engine, thereby improving the lubrication performance.

While the present disclosure has been described with respect to the specific embodiments, it will be apparent to those skilled in the art that various changes and modifications may be made without departing from the spirit and scope of the invention as defined in the following claims.

What is claimed is:

1. A piston pin having different materials and installed through a piston and an upper end of a connecting rod, the piston rod comprising:
    a cylindrical outer member; and
    a cylindrical inner member including a material having lower density than the outer member, the cylindrical inner member arranged in the outer member,
    wherein the cylindrical inner member is forced into the outer member, and
    the cylindrical inner member is inclined to have a concave end portion.

2. The piston pin of claim 1, wherein the outer member comprises titanium carbide (TiC).

3. The piston pin of claim 2, wherein the outer member includes a mixture of cold alloy tool steel and TiC, the cold alloy tool steel containing 1.4 wt % to 1.6 wt % of carbon (C), 11 wt % to 13 wt % of chrome (Cr), 11 wt % to 13 wt % of molybdenum (Mo), 0.8 wt % to 1.2 wt % of nickel (Ni), 0.2 wt % to 0.5 wt % of vanadium (V), 0.0001 wt % to 0.4 wt % of silicon (Si), 0.0001 wt % to 0.6 wt % of manganese (Mn), 0.0001 wt % to 0.03 wt % of phosphorous (P), 0.0001 wt % to 0.03 wt % of sulfur (S) and the rest wt % of steel (Fe), based on the total weight of the cold alloy tool steel.

4. The piston pin of claim 3, wherein the outer member contains 20 wt % of TiC.

5. The piston pin of claim 1, wherein the inner member includes one or more selected from the group consisting of aluminum (Al) alloy, titanium (Ti) alloy, and carbon fiber-reinforced plastic (CFRP).

6. The piston pin of claim 1, wherein at a portion adjacent to an end of the outer member, the outer member has an inner diameter that increases toward the end of the outer member, such that a thickness of the outer member decreases.

7. The piston pin of claim 6, wherein the outer member has a constant outer diameter.

8. A piston pin having different materials and installed through a piston and an upper end of a connecting rod, the piston pin comprising:
    a cylindrical outer member; and
    a cylindrical inner member located in the outer member, in which a center of the cylindrical inner member is arranged at a position which is eccentric with respect to a center of the outer member.

9. The piston pin of claim 8, wherein the center of gravity of the piston pin is positioned eccentrically with respect to the center of the outer member.

10. The piston pin of claim 9, wherein the center of gravity of the piston pin is positioned in an opposite direction of the center of the inner member from the center of the outer member.

11. The piston pin of claim 10, wherein the outer member has a higher density than the inner member.

12. A method for manufacturing a piston pin having different materials, the piston pin installed through a piston and an upper end of a connecting rod, the method comprising:
    placing a cylindrical outer member in a die in which a punching device is installed to be lifted or lowered;
    forcing a cylindrical inner member into the outer member, such that the inner member is arranged in the outer member, the inner member having a different material from the outer member; and
    pressurizing both ends of the outer member and the inner member such that the inner member does not come off the outer member,
    wherein the outer member has a constant outer diameter at a portion adjacent to an end of the outer member which has a thickness that decreases toward the end thereof, and
    wherein the pressurizing of both ends of the outer member and the inner member comprises pressurizing the end of the inner member with respect to the outer member such that the end of the inner member is concavely deformed.

13. The method of claim 12, wherein the pressurizing of both ends of the outer member and the inner member comprises deforming the inner member such that the outer diameter of the inner member increases at a portion adjacent to the end of the inner member.

14. The method of claim 12, wherein the inner member is forced into the outer member in a state where the inner member is eccentric with respect to the outer member.

15. The method of claim 12, wherein the inner member includes a material having a lower density than the outer member.

16. The method of claim 15, wherein the outer member includes a mixture of cold alloy tool steel and TiC, the cold alloy tool steel containing 1.4 wt % to 1.6 wt % of C, 11 wt % to 13 wt % of Cr, 11 wt % to 13 wt % of Mo, 0.8 wt % to 1.2 wt % of Ni, 0.2 wt % to 0.5 wt % of V, 0.0001 wt % to 0.4 wt % of Si, 0.0001 wt % to 0.6 wt % of Mn, 0.0001 wt % to 0.03 wt % of P, 0.0001 wt % to 0.03 wt % of S and the rest wt % of Fe, based on the total weight of the cold alloy tool steel.

17. The method of claim 16, wherein the outer member contains 20 wt % of TiC.

* * * * *